US009742611B2

(12) United States Patent
Elenes

(10) Patent No.: US 9,742,611 B2
(45) Date of Patent: Aug. 22, 2017

(54) SYNCHRONIZING ORTHOGONAL FREQUENCY DIVISION MULTIPLEXED (OFDM) SYMBOLS IN A RECEIVER

(71) Applicant: SILICON LABORATORIES INC., Austin, TX (US)

(72) Inventor: Javier Elenes, Austin, TX (US)

(73) Assignee: Silicon Laboratories Inc., Austin, TX (US)

(*) Notice: Subject to any disclaimer, the term of this patent is extended or adjusted under 35 U.S.C. 154(b) by 236 days.

(21) Appl. No.: 14/061,084

(22) Filed: Oct. 23, 2013

(65) Prior Publication Data

US 2015/0110228 A1    Apr. 23, 2015

(51) Int. Cl.
*H04L 27/26* (2006.01)

(52) U.S. Cl.
CPC ...... *H04L 27/2657* (2013.01); *H04L 27/2662* (2013.01); *H04L 27/2671* (2013.01); *H04L 27/2678* (2013.01)

(58) Field of Classification Search
CPC .................................................. H04L 27/2679
USPC ................................................ 375/259, 260
See application file for complete search history.

(56) References Cited

U.S. PATENT DOCUMENTS

| | | | |
|---|---|---|---|
| 5,838,742 A | 11/1998 | Abu-Dayya | |
| 6,069,912 A | 5/2000 | Sawahashi et al. | |
| 6,151,372 A | 11/2000 | Yamamoto | |
| 6,236,844 B1 | 5/2001 | Cvetkovic et al. | |
| 6,393,083 B1 | 5/2002 | Beukema | |
| 6,654,340 B1 | 11/2003 | Jones et al. | |
| 6,760,386 B2 | 7/2004 | Li et al. | |
| 6,961,393 B1 * | 11/2005 | Cupo et al. | 375/343 |
| 7,421,046 B2 | 9/2008 | Wallace et al. | |
| 7,627,051 B2 | 12/2009 | Shen et al. | |
| 8,064,528 B2 | 11/2011 | Giannakis et al. | |
| 8,155,610 B2 | 4/2012 | Elenes | |
| 8,351,534 B2 | 1/2013 | Mussmann et al. | |
| 2002/0045432 A1 | 4/2002 | Yoshida | |
| 2002/0061051 A1 | 5/2002 | Kitahara | |
| 2002/0131536 A1 | 9/2002 | Veillette | |

(Continued)

FOREIGN PATENT DOCUMENTS

| | | | |
|---|---|---|---|
| DE | EP 2355387 A1 * | 8/2011 | ............ H04J 3/0632 |
| EP | 0 716 513 A1 | 12/1996 | |
| JP | 2005269026 | 9/2005 | |

OTHER PUBLICATIONS

PCT/US2009/044759 International Search Report with Written Opinion of the International Searching Authority mailed Jan. 5, 2010.

(Continued)

*Primary Examiner* — Kevin M Burd
(74) *Attorney, Agent, or Firm* — Trop, Pruner & Hu, P.C.

(57) ABSTRACT

In an embodiment, an apparatus includes a buffer to store incoming orthogonal frequency division multiplexed (OFDM) samples. This buffer is configured to output the OFDM samples according to a read pointer that can be adjusted by a sum value corresponding to a sum of a length of a symbol and a feedback value, to align the read pointer with the symbol. In addition, the apparatus further includes a feedback circuit coupled to the buffer to receive the output OFDM samples and generate the feedback value based at least in part on the output OFDM samples.

12 Claims, 6 Drawing Sheets

(56) References Cited

U.S. PATENT DOCUMENTS

| | | | |
|---|---|---|---|
| 2004/0165690 A1* | 8/2004 | Kaylani | G06F 1/025 375/372 |
| 2006/0031276 A1 | 2/2006 | Kumamoto et al. | |
| 2006/0056281 A1 | 3/2006 | Ngo et al. | |
| 2007/0036249 A1 | 2/2007 | Shatara et al. | |
| 2008/0025446 A1 | 1/2008 | Van Wechel et al. | |
| 2008/0031369 A1 | 2/2008 | Li et al. | |
| 2009/0103644 A1 | 4/2009 | Nakao | |
| 2009/0298453 A1 | 12/2009 | Elenes et al. | |
| 2010/0086084 A1* | 4/2010 | Aratani | H04L 27/2679 375/340 |
| 2010/0135377 A1 | 6/2010 | Li et al. | |
| 2010/0159837 A1 | 6/2010 | Dent et al. | |
| 2010/0165926 A1 | 7/2010 | Fukuoka et al. | |
| 2011/0103435 A1 | 5/2011 | Whikehart | |
| 2011/0158339 A1 | 6/2011 | Tuttle et al. | |
| 2011/0158357 A1 | 6/2011 | Djadi et al. | |
| 2011/0242964 A1* | 10/2011 | Porat | H04L 27/2647 370/210 |
| 2011/0243209 A1 | 10/2011 | Oren et al. | |
| 2011/0310948 A1 | 12/2011 | Ramesh et al. | |
| 2012/0321012 A1 | 12/2012 | Elenes et al. | |
| 2013/0003801 A1* | 1/2013 | Elenes | H04H 40/18 375/224 |
| 2014/0094130 A1 | 4/2014 | Elenes et al. | |

OTHER PUBLICATIONS

U.S. Appl. No. 12/894,316, filed Sep. 30, 2010 entitled, "Detecting Digital Radio Signals," by Javier Elenes, et al.
U.S. Appl. No. 14/015,238, filed Aug. 30, 2013.
U.S. Appl. No. 13/630,457, filed Sep. 28, 2012.
U.S. Appl. No. 13/162,164, filed Jun. 16, 2011.
U.S. Appl. No. 14/015,238, entitled "Antenna Diversity Combining for Differentially Modulated Orthogonal Frequency Division Multiplexed (OFDM) Signals", filed Aug. 30, 2013, by Javier Elenes, et al.

* cited by examiner

SYNCHRONIZING ORTHOGONAL FREQUENCY DIVISION MULTIPLEXED (OFDM) SYMBOLS IN A RECEIVER

BACKGROUND

In many different radio systems, it is necessary to synchronize a receiver to properly receive and process an incoming data stream. This is so, as a transmitter and receiver may suffer from variations in symbol timing and in carrier frequency generation and so forth. Furthermore, synchronization is needed to enable proper alignment in time and frequency of processing circuitry within a receiver. In typical receiver systems, synchronization is generally performed based on a priori knowledge of certain information received within an incoming data stream.

That is, many communications standards insert synchronization information periodically during a data stream so that a receiver can synchronize its processing according to this synchronization information. However, in certain communication systems such as a digital audio broadcasting (DAB) system, such synchronization information is communicated at a relatively slow rate, which can cause difficulties in synchronization, particularly in the presence of noise and multipath interference.

SUMMARY OF THE INVENTION

In one aspect, an apparatus includes a buffer to store incoming orthogonal frequency division multiplexed (OFDM) samples. This buffer is configured to output the OFDM samples according to a read pointer, and the read pointer is adjusted by a sum value corresponding to a sum of a length of a symbol and a feedback value, to align the read pointer with the symbol. In addition, the apparatus further includes a feedback circuit coupled to the buffer to receive the output OFDM samples and generate the feedback value based at least in part on the output OFDM samples.

The feedback circuit may include, in an example, a correlation unit to compute a prefix correlation on the output OFDM samples; a peak detector to detect at least one peak value of the prefix correlation and to output a sample index of the at least one peak value; and a loop filter to filter the sample index. The loop filter may be configured as a second order filter including: a first path having an integral element; a second path having a proportional element and a filter element coupled to an output of the integral element; and a summer coupled to an output of the first and second paths. A truncation unit may be present to truncate the loop filter output to obtain an integer value.

In addition, a summer may be present and configured to generate a sum value, where the summer is to sum the sample index with a predetermined value corresponding to the symbol length to generate the sum value. In turn, an integrator may be coupled to the summer to integrate the sum value. A carrier frequency offset unit may be configured to receive the peak value and to generate a carrier offset value therefrom.

In an embodiment, the apparatus may further include: a second loop filter to filter the carrier offset value to generate a frequency control signal; a frequency synthesizer to generate a complex exponential value; and a multiplier to multiply the incoming OFDM samples with the complex exponential value.

In another aspect, an apparatus includes a receiver front end to generate a channelized complex signal from an incoming radio frequency (RF) signal including an OFDM stream, and a synchronization unit coupled to the receiver front end to receive the channelized complex signal and to determine symbol timing and a carrier frequency of the OFDM stream without use of synchronization information within the OFDM stream. The apparatus may be a tuner to provide an output data stream to a demodulator having substantially zero timing offset and substantially zero frequency offset.

In one example, the synchronization unit includes: an asynchronous sampling rate converter to receive the OFDM stream at a first rate and to output samples of the OFDM stream at a second rate responsive to a feedback value; a buffer to store the samples of the OFDM stream; and a feedback circuit coupled between the buffer and the asynchronous sampling rate converter to receive the OFDM samples from the buffer and generate the feedback value based at least in part on the OFDM samples. In an example, the feedback value is to align the transmitted OFDM symbol to a window of a fast Fourier transform (FFT) engine. The feedback circuit may include a correlation unit to compute a cyclic prefix correlation on the OFDM stream, a peak detector to detect at least one peak value of the cyclic prefix correlation and to output a sample index of the at least one peak value, and a loop filter to filter the sample index.

In another aspect, a method includes storing OFDM samples in a buffer of a receiver, performing a correlation on a symbol width of the OFDM samples obtained from the buffer, determining a peak value in the correlation, the peak value corresponding to an index of a peak OFDM sample, filtering the peak value, and outputting the OFDM samples from the buffer to a signal processing path of the receiver based at least in part on the filtered peak value.

The method may include determining a carrier frequency offset using the peak value, and correcting the OFDM samples output from the buffer based on the carrier frequency offset. Note that the OFDM samples may be received from a front end circuit of the receiver at a first rate and stored into the buffer at a second rate. In this case, a rate control signal may be generated based on the filtered peak value and a predetermined sampling rate, and a sample rate converter coupled between the front end circuit and the buffer may be controlled according to the rate control signal.

DETAILED DESCRIPTION

Embodiments provide a synchronization technique for reception of radio signals, such as transmitted according to an orthogonal frequency division multiplexing (OFDM) scheme. As examples, the radio signals may be digital broadcast radio signals such as digital audio broadcast (DAB) signals, so-called high definition (HD™) signals, wireless signals such as corresponding to an IEEE 802.11 standard, among others. After receipt in a receiver (which includes tuner circuitry and receiver circuitry) from an associated antenna, the radio frequency (RF) signal may be downconverted, digitized, and channelized. The channelized signal may then be converted to the frequency domain to obtain a frequency domain signal that may then be provided to a soft symbol decoder followed by a de-interleaver and forward error correction (FEC) decoder.

Figure 1A:
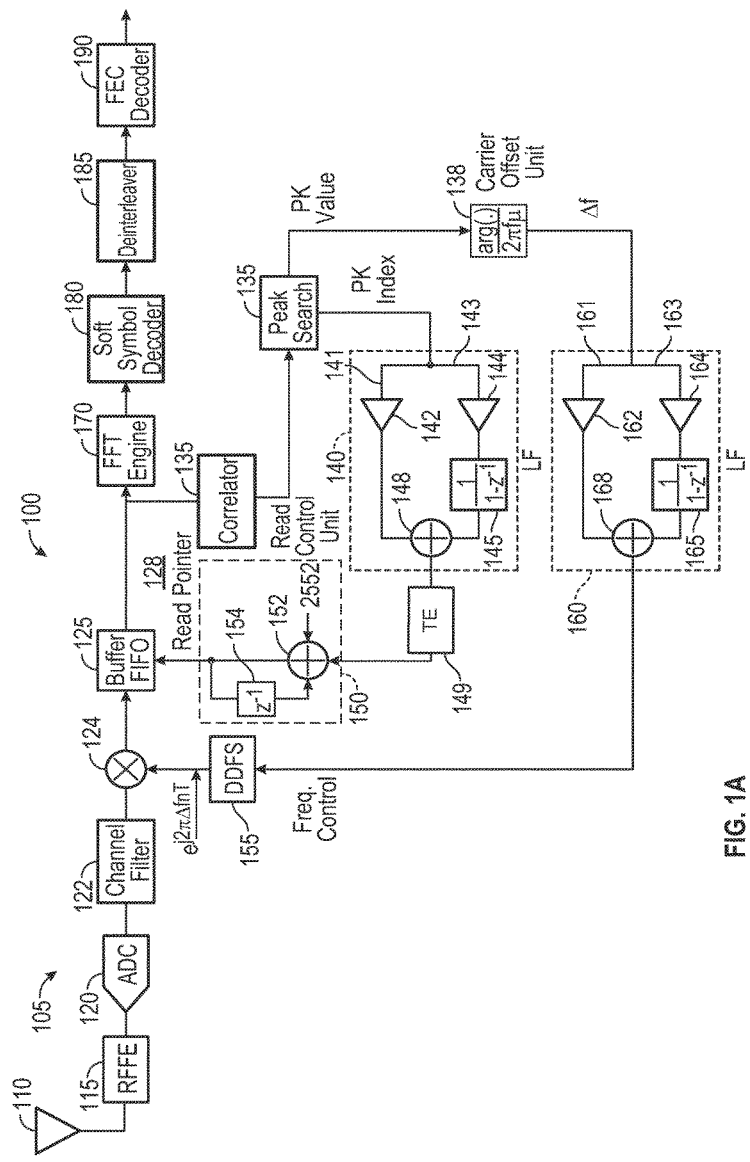
FIGS. 1A and 1B are block diagrams of receivers according to different embodiments.

Referring now to FIG. 1A, shown is a block diagram of a receiver in accordance with an embodiment. As shown in FIG. 1A, receiver 100 may include a signal processing path 105 having various components. As will be discussed further below, embodiments can be incorporated in different types of receiver systems. In some embodiments, receiver 100 may be a single-die integrated circuit such as a CMOS die having mixed signal circuitry including both analog and digital circuitry. Certain circuitry may additionally be present in another chip such as a digital demodulator and FEC decoder.

With reference to receiver 100, an incoming RF signal which may include digital radio signals according to a given digital broadcast specification may be received over the air via an antenna 110. As used herein, the terms "digital radio" or "digital radio broadcast signal" are used interchangeably and are intended to correspond to broadcast radio communication that occurs digitally, e.g., as one or more sideband channels to a main analog signal channel. Such communications may be in accordance with various standards such as a National Radio System Committee (NRSC-5C, also known as HD™ radio), Digital Audio Broadcasting (DAB), Digital Radio Mondiale (DRM) or other standard. The RF signal may be provided to a RF front end (RFFE) circuit 115. Generally, RFFE 115 includes various analog circuitry to receive, process, and downconvert the RF signal to a lower frequency signal, e.g., a low-IF or zero-IF signal. This downconverted signal is an in-phase/quadrature phase (IQ) signal. In general, RFFE circuit 115 may include gain control elements, downconversion circuitry, filters and so forth.

The resulting downconverted signal may be provided to an analog-to-digital converter (ADC) 120, where the signal can be digitized into a digital signal. Note that in some embodiments, either before or after digitization, channelization may be performed to generate a channelized signal. In an OFDM system, a plurality of samples forms a symbol of an incoming data stream. The samples of these symbols are provided through a multiplier 124, which in an embodiment is a complex multiplier to provide a frequency correction value to the incoming data stream, details of which are described further below.

In turn, samples are provided to a first in first out (FIFO) buffer 125 for storage and output to a main signal processing path including a fast Fourier transform (FFT) engine 170, which generates frequency domain OFDM symbols from the incoming time domain OFDM symbols. In one embodiment, each incoming time domain OFDM symbol can be processed by FFT engine 170 into a plurality of sub-carriers, e.g., 2048 sub-carriers, although embodiments are not limited in this regard.

In addition, the incoming time domain OFDM symbol from ADC 120 may be provided, via buffer 125, to a synchronization unit 128, which may be used to synchronize the receiver with the transmitter in accordance with the embodiments described here, which leverage the signal information itself, rather than predetermined pilot or other synchronization information transmitted throughout a given transmission. Based on the synchronization information generated by synchronization unit 128, control of various front end elements can be performed. For example a read control signal can be provided to the FIFO to align the FFT window to the incoming OFDM symbol. Alternatively a rate control signal can be provided to adapt the sampling rate of the incoming signal in order to align the FFT window to the incoming OFDM symbol. Also a frequency control signal is provided to precisely frequency align the FFT bins in the receiver to the transmitted OFDM subcarriers.

The sub-carrier outputs from FFT engine 170 form a frequency domain symbol that in turn is provided to a soft-symbol decoder 180, which produces a soft bit per demodulated sub-carrier. Note that in some embodiments, receiver 100 formed of a single chip CMOS die includes only the circuitry before soft-symbol decoder 180 such that frequency domain samples are output from the chip.

The output from soft-decision decoder 180 is provided to a deinterleaver 185 and a FEC decoder 190. In a most general case, e.g., for the receiver shown in FIG. 1, the de-interleaved soft bits may be provided to FEC decoder 190 which includes various components to further decode the soft bits into an audio output. As an example, in a DQPSK system such as DAB, demodulated QPSK symbols are scaled and quantized into soft bits which are provided to a deinterleaver, Viterbi decoder and Reed-Solomon decoder to generate an encoded audio signal. The encoded audio signal is then provided to an audio source decoder (not shown for ease of illustration in FIG. 1A) to generate source audio. Although shown as individual components, understand that portions of the receiver after ADC 120 to the end of the signal processing path of FIG. 1 can be implemented in a digital signal processor (DSP). Note that while described with this particular embodiment in FIG. 1A, other implementations are possible, and additional circuitry can be present. For example, the RF front end may further be coupled to other back end circuitry to handle demodulation of analog radio bands such as AM or FM bands. And further understand that in many embodiments, a receiver may output frequency domain samples to another chip that implements the demodulator/FEC.

With further reference to FIG. 1A, also shown is a block diagram of a synchronization unit in accordance with an embodiment of the present invention. As shown in FIG. 1A, synchronization unit 128 includes a plurality of components. Although shown at this particular level and with the particular components in FIG. 1A, understand that variations are possible. For example, a synchronization unit may be configured in other types of hardware, may be realized via combinations of hardware, software, and firmware and also may be implemented within a microcontroller or a digital signal processor.

As seen in FIG. 1A, incoming channelized signal data is received in buffer 125. For an OFDM system, incoming channelized data is in the form of OFDM samples and buffer 125 is configured to include at least a number of entries greater than an OFDM symbol (i.e., at least greater than 2552 entries). During operation, the incoming samples are stored and are output according to a read pointer, which as described herein is dynamically adjusted to realize the synchronization performed here.

In general, synchronization unit 128 is implemented as a feedback circuit coupled between an output of buffer 125 and a control input to the buffer, namely a read pointer that is used to output samples from the buffer. More specifically, a read control unit 150 is configured to generate a read pointer that advances from the beginning of a symbol to the beginning of the next symbol. In general, read control unit 150 may operate once per symbol During this operation, the circuit is configured to advance the read pointer by an amount corresponding to a predetermined value (namely the symbol width) plus a correction value, in order to advance read out an appropriate number of samples so that alignment with a first sample of a symbol is eventually achieved. Thus read control unit is configured to add (or subtract) samples to a nominal symbol width based on the output of the feedback loop. For DAB systems in which a longer duration "null symbol" in transmitted per DAB frame (a DAB frame is 96 ms long and consists of a null symbol followed by 76 OFDM symbols), the read control unit is assumed to be coarsely aligned with the DAB frame (to within 1 OFDM symbol period).

In this manner, instead of leveraging predetermined synchronization data within an incoming data stream (such as time frequency phase reference (TFPR) symbols in a DAB system), embodiments perform synchronization based on information available in a cyclic prefix of a symbol. That is, given the structure of an OFDM symbol that includes a cyclic prefix, a determination can be made as to the location of repetitive or duplicative data within the symbol. Thus although the content of this duplicative data is not known a priori (such as via a predetermined TFPR or other pilot-type information), the presence of redundant data within a symbol enables synchronization to be performed based on information present within the symbol itself. Stated another way, synchronization occurs based on information provided within a symbol as normal payload data, rather than dedicated synchronization or other timing information communicated within a data stream. In this way, synchronization may be performed in a more rapid manner and may be completed to a convergence much faster than using known timing symbols such as TFPR symbols.

For example, in a DAB system, a data frame is formed of one null symbol, one TFPR symbol, and 76 symbols of payload data. This frame of data is 96 milliseconds (ms) long. Using a conventional synchronizer that operates using the TFPR information, it can take multiple DAB frames to synchronize a receiver to an incoming data stream. Instead performing synchronization based on payload information, embodiments may synchronize an incoming data stream within a few symbols of one data frame, leading to much faster synchronization. Further, particularly in the presence of signal impairments such as noise or fading, synchronization realized using information of a single symbol is much more resilient, as if a TFPR symbol is lost due to such impairment, a conventional receiver can remain unsynchronized for an undesirably long period of time.

Thus the feedback loop of synchronization unit 128 provides a correction value to update the read pointer to cause buffer 125 to begin outputting samples at the start of a symbol. By synchronizing the output of buffer 125 to be at a symbol start, these samples provided to a discrete Fourier transform engine, such as a fast Fourier transform (FFT) engine to convert the time domain information into the frequency domain, can avoid deleterious effects of inter-symbol interference that could occur if a previous sample were to bleed into the prefix of a current symbol.

Buffer 125 is read according to the read pointer to thus output samples that are provided to a cyclic prefix correlation unit 130, details of which are described further below. Suffice to say, correlation unit 130 performs a correlation using the cyclic prefix of an OFDM symbol and outputs correlation values, once per symbol, to a peak detector 135.

In general, peak detector 135 is configured to detect one or more peak values within this correlation data. In some embodiments, a single greatest correlation value is considered to be the peak while in other embodiments a multiple number of the largest correlation values may be selected as peak values. Peak detector 135 further includes logic to select a single most appropriate correlation value, which is output as a sample index corresponding to the index value of the selected peak sample (i.e., for an OFDM symbol this sample index value is between 0 and 2047).

Still referring to FIG. 1A, synchronization unit 128 further includes a loop filter to receive this sample index value. In the embodiment shown, loop filter 140 is a second-order filter including a first path 141 and a second path 143. Specifically, first path 141 is a proportional path including a proportional element 142 which in an embodiment may be a controllable coefficient value, e.g., provided from a controller that configures the value, e.g., based on configuration settings or dynamic analysis of system operation. Second path 143 is an integral path including an integral element 142 which in an embodiment may be a controllable coefficient value. Furthermore, integral path 143 includes a filter 145 to integrate an output of integral element 144. As will be described herein, filter 145 acts as an integrator to accumulate a frequency offset and provide a value used for updating the read pointer. Both path outputs are coupled to a summer 148 that combines the values and thus outputs a loop filter output.

In some embodiments, the loop filter output is coupled to a truncation element 149 that operates to take this loop filter value, which may include an integer and a fractional component, and remove the fractional component, to thus output an integer value to read control unit 150. When present this truncation element removes the fractional value so that the read pointer update to be provided to buffer 125 is an integer value, enabling an exact update to the read pointer. However understand that a truncation element is optional and other manners of dealing with a non-integer value are possible in other embodiments. In either event, the loop filter value is coupled to read control unit 150.

Still referring to FIG. 1A, read control unit 150 includes a summer 152 configured to receive this loop filter output and a value corresponding to a symbol length. In an embodiment, a predetermined value is set according to the type of modulation scheme according to the length of a symbol. For example, in a DAB system there may be variable-sized symbols, as a null symbol has a first length and other symbols and have a second length. Based on other processing in the tuner, the appropriate symbol length may be accommodated by providing an appropriate predetermined value as an input to this summer. For example, for a null symbol, a predetermined value of 2656 is provided, while for other symbols a predetermined value of 2552 is provided. The output of summer 152 is coupled to a filter 154. Combined, summer 152 and filter 154 implement an integrator to thus integrate the value output from summer 152 to generate the read pointer. As such, the read pointer value may be a continually increasing value during processing of symbols such that buffer 125 (or another component) performs a modulo operation on this value to obtain the actual pointer value to be used for read operations within buffer 125. Although shown at this high level in the FIG. 1A embodiment, understand that variations and other implementations are possible.

Figure 2A:
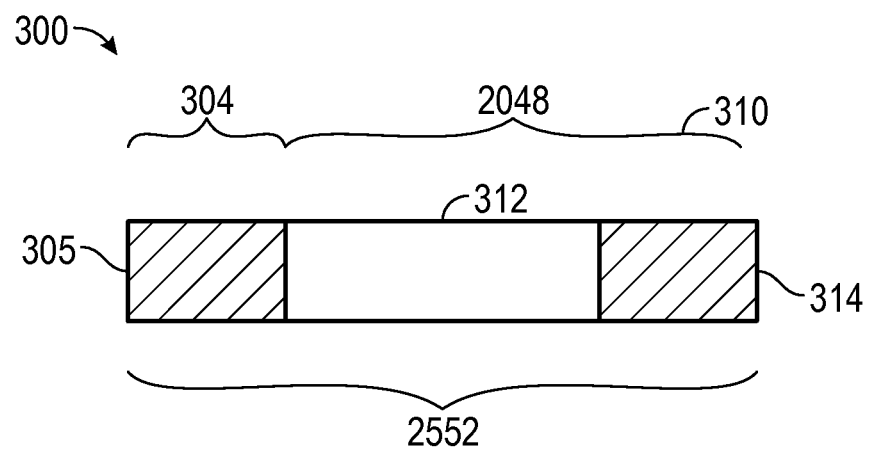
FIG. 2A is a block diagram of an example OFDM symbol according to one embodiment.

Referring now to FIG. 2A, shown is a block diagram of an example OFDM symbol. Specifically, FIG. 2A shows an OFDM symbol 300 that includes 2552 samples, including a data payload 310 having 2048 distinct samples formed of a first portion 312 and a tail portion 314. Tail portion 314 is, at a transmitter, prepended as a header portion 305 of symbol 300 to be a cyclic prefix. Thus cyclic prefix 305 includes 504 samples that are duplicative with the last 504 samples of data payload 310.

Figure 2B:
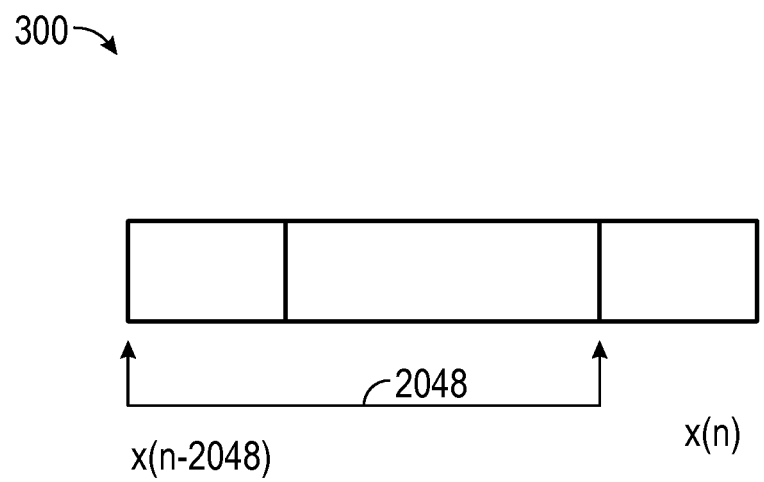
FIG. 2B is a representation of an example correlation.

Embodiments leverage this cyclic prefix in performing the synchronization operations described here. More specifically, within a cyclic prefix correlation unit, a correlation of the current symbol is calculated that accumulates individual correlations for each sample in time. In general, a current sample is correlated with an earlier sample (the earlier sample being a symbol width prior to the current sample) and then a tail portion is subtracted. FIG. 2B illustrates one correlation of a current sample x(n) (that is the first sample within tail portion 314) with a prior sample corresponding to the first sample of symbol 300, namely the first sample of cyclic prefix 305, x(n−2048). In an embodiment the correlator may perform the following recursive sum:

$$c(n)=c(n-1)+x(n)x^*(n-val1)-x(n-val2)x^*(n-val1-val2) \quad [\text{EQ. 1}]$$

where c(n) is the correlation for the current sample and c(n−1) is the correlation of the prior sample and the superscript indicates complex conjugate. In turn, for a DAB system, val1=2048*i and val2=504, and for a HD system, val1=2048 and val2=112.

Figure 2C:
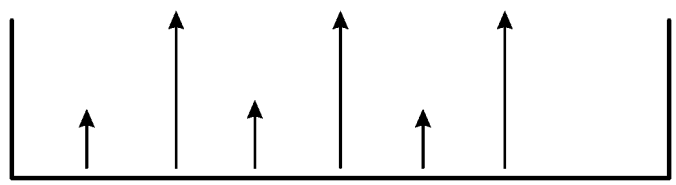
FIG. 2C is a graphical illustration of a correlation unit output according to an embodiment.

FIG. 2C shows an example output of the cyclic prefix correlation unit in which regular peaks are established that are aligned to the beginning of symbols. These peaks may be substantially greater than any of the other correlations and may be spaced apart at symbol width (2552 samples). Due to impairments in signal reception, e.g., due to noise, multipath interference or fading (where reflections arrive at different times) and so forth, additional peaks may be present that can come close to or exceed the correlation corresponding to the beginning of a symbol or, in the presence of flat fading (where reflections arrive at the same time), a peak may be lost due to noise. To this end, a peak detector includes logic to identify one or more peaks and to select from these peaks the most appropriate peak to detect and to output a sample index corresponding to this peak. In an embodiment this identification logic may be based on heuristics or another algorithm to determine a correct symbol beginning point. In general, a first arriving peak may be selected where multiple peaks are detected (unless this peak is substantially smaller than a later peak).

As described above, this sample index is provided to further portions of the feedback circuit to generate the read pointer update. In addition, the peak value (a complex number) can be provided to a separate carrier offset unit which may generate a carrier frequency offset value (delta F) that can be used to remove any identified carrier offset. The carrier offset is computed by taking the complex angle of the peak value. Note that an incoming data stream can have several different offsets. Namely an incoming data stream may have an offset in symbol timing reflecting differences in timing between the transmitter and receiver. Further, the incoming information may further be subject to carrier frequency offset. Such carrier frequency offset exists when there is variation between a carrier frequency as generated at a transmitter and the same carrier frequency as generated at the receiver.

By providing carrier offset correction within a tuner, a resulting processed signal provided to downstream demodulator circuitry is free of any carrier offset. As such, the processing to be performed in the demodulator is simplified. Further to this point, by providing a zero offset signal to the demodulator, a feedback path typically present from a demodulator back to a tuner to provide for frequency correction information can be avoided. Although in some implementations no feedback path is present, in many other implementations a feedback path is still present. However, due to the carrier frequency correction performed within the tuner, this feedback path may be disabled or at the least, the feedback information provided can be of a zero or extremely low value, which can be ignored by the tuner.

With further reference back to FIG. 1A, also shown is a block diagram of a carrier offset unit in accordance with an embodiment. As shown in FIG. 1A, carrier offset unit 138 is coupled to receive a peak value from the output of peak detector 135. Based on the received peak value, offset correction unit 138 can calculate a carrier offset correction value to align the received OFDM subcarriers with the FFT bins in the receiver. In an embodiment this carrier offset correction may be calculated by obtaining the complex angle of the peak value. The resulting angle Φ divided by 2πfu, where fu is the sub-carrier frequency spacing in Hz, corresponds to the frequency offset, which may then be applied to the sample stream to correct these samples before they are further processed in the tuner signal processing path. In an embodiment, frequency offset correction can be realized in a feedback loop configuration by filtering the offset using a loop filter and using the loop filter output to generate a complex exponential and multiplying the FIFO input data samples by this complex exponential.

More specifically, FIG. 1A also shows a carrier offset correction feedback loop which may be coupled in parallel with at least portions of the read pointer correction feedback loop. Here the peak value determined in peak search unit 135 may further be provided to a carrier offset unit 138, where a carrier offset value corresponding to a frequency offset may be determined. In turn, this carrier offset value may be provided to another loop filter 160 which may be a second-order loop filter generally configured the same as loop filter 140. Thus as seen, a proportional path 161 and an integral path 163 are provided, each of which includes a corresponding element 162 and 164. The output of integral element 164 is coupled to a filter element 165, the output of which is summed in a summer 168 with the output of proportional element 162 to thus generate a filtered frequency control signal that in turn is provided to a frequency synthesizer. More specifically in FIG. 1A, a direct digital frequency synthesizer 155 is present to generate a complex exponential from this frequency control signal. In turn, the incoming OFDM samples from channel filter 122 are multiplied with this complex exponential in a complex multiplier 124 and are thereafter stored into corresponding entries of buffer 125. Of course understand that other types of frequency offset correction can be performed in another feed forward manner, or a feedback loop can be established in other embodiments.

Figure 3:
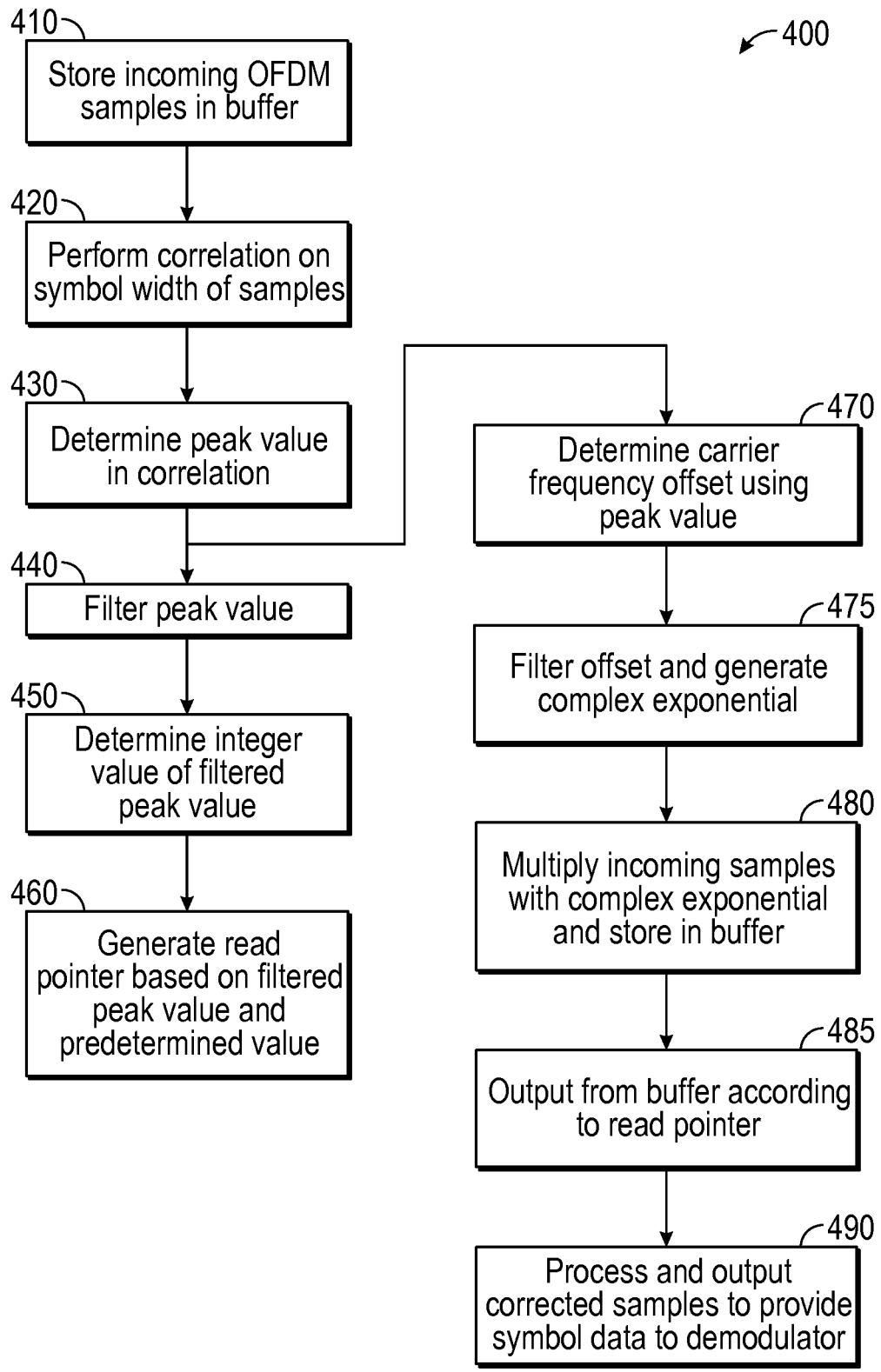
FIG. 3 is a flow diagram of a method for performing synchronization according to one embodiment.

Referring now to FIG. 3, shown is a flow diagram of a method for performing timing synchronization in accordance with an embodiment. As shown in FIG. 3, method 400 may be executed using at least in part a feedback circuit such as that of FIG. 1A. Method 400 begins by receiving and storing incoming OFDM samples into a buffer (block 410). These incoming samples may be channelized quadrature samples generated in a receiver front end and digitized by a digitizer such as an ADC. Next a correlation may be performed on a symbol width of samples (block 420). Once per symbol the feedback loop may be updated.

Still referring to FIG. 3, a peak value in the correlation may be determined (block 430). This peak value may be the greatest peak within the correlation data, or it may be a selected one of multiple peaks, e.g., based on algorithmic selection of a most appropriate peak value. At block 430, the sample index corresponding to the selected peak value is output. Next at block 440 this value is filtered. In an embodiment, a second-order filter may be used to perform the filtering.

Still referring to FIG. 3, at block 450 an integer value of the filtered index value may be determined. For example, a floor or truncation element may extract the integer value of the filter output. Finally from this integer value, a read pointer may be generated (block 460). More specifically, the integer value and a predetermined value, which corresponds to a nominal symbol width, may be used to generate the read pointer, e.g., via an integration operation. As will be further discussed, this read pointer may be used to control output of the samples from the buffer for the main signal processing path to enable the samples to be output beginning with a first sample of a symbol.

In addition to this main feedback circuit operation to provide a feedback value corresponding to a read pointer for the buffer, in some embodiments carrier frequency offset correction may be performed using the peak value. Thus as further seen in FIG. 3, the peak value obtained in block 430 may further be used for determining a carrier frequency offset (block 470). Different manners of determining the carrier frequency offset using this peak value may be realized. In an embodiment, a calculation may be performed to determine the complex angle of the peak value. This complex angle thus corresponds to the carrier frequency offset. In turn, the carrier frequency offset is filtered and from the filtered offset, a complex exponential value may be generated (block 475). Then incoming samples may be multiplied with this complex exponential value, the result of which is stored into the buffer (block 480). Note that this storage of samples in block 480 thus corresponds to the block 410 step of storing samples into the buffer. However this complex multiplication occurs prior to storage of the samples into the buffer. In any event, control passes from block 480 to block 485 where samples may be output from the buffer according to the read pointer thus generated by the feedback circuit. Finally, these output samples may be processed and output to provide symbol data to a demodulator to enable demodulation operations to be performed (block 490). Because carrier frequency offset correction has already been performed (optionally), demodulator implementation may be eased. Although shown at this high level in the embodiment of FIG. 3, understand that variations are possible.

Thus using a synchronization unit such as in FIG. 1A, improved synchronization operations can be realized with reduced overhead. Furthermore, the resulting processed signals can be provided to a downstream demodulator with zero carrier frequency offset, enabling reduced complexity in the demodulator. Note that in an embodiment the samples provided to the demodulator have zero fractional carrier offset (stated another way, the samples are exactly aligned in frequency with the FFT bins). Any residual frequency offset is an integer multiple of the OFDM subcarrier spacing (FFT bin spacing) and therefore can be easily corrected by the demodulator by circularly shifting the FFT output samples. And as discussed above it is possible to further perform timing offset correction in the signal processing path of the tuner as well.

In yet other embodiments, a different type of synchronization unit can be provided that enables both carrier frequency offset and timing offset to be corrected in an efficient manner, enabling communication of processed signals to a demodulator with no offsets whatsoever, potentially enabling open loop operation as between the demodulator and the tuner.

Figure 1B:
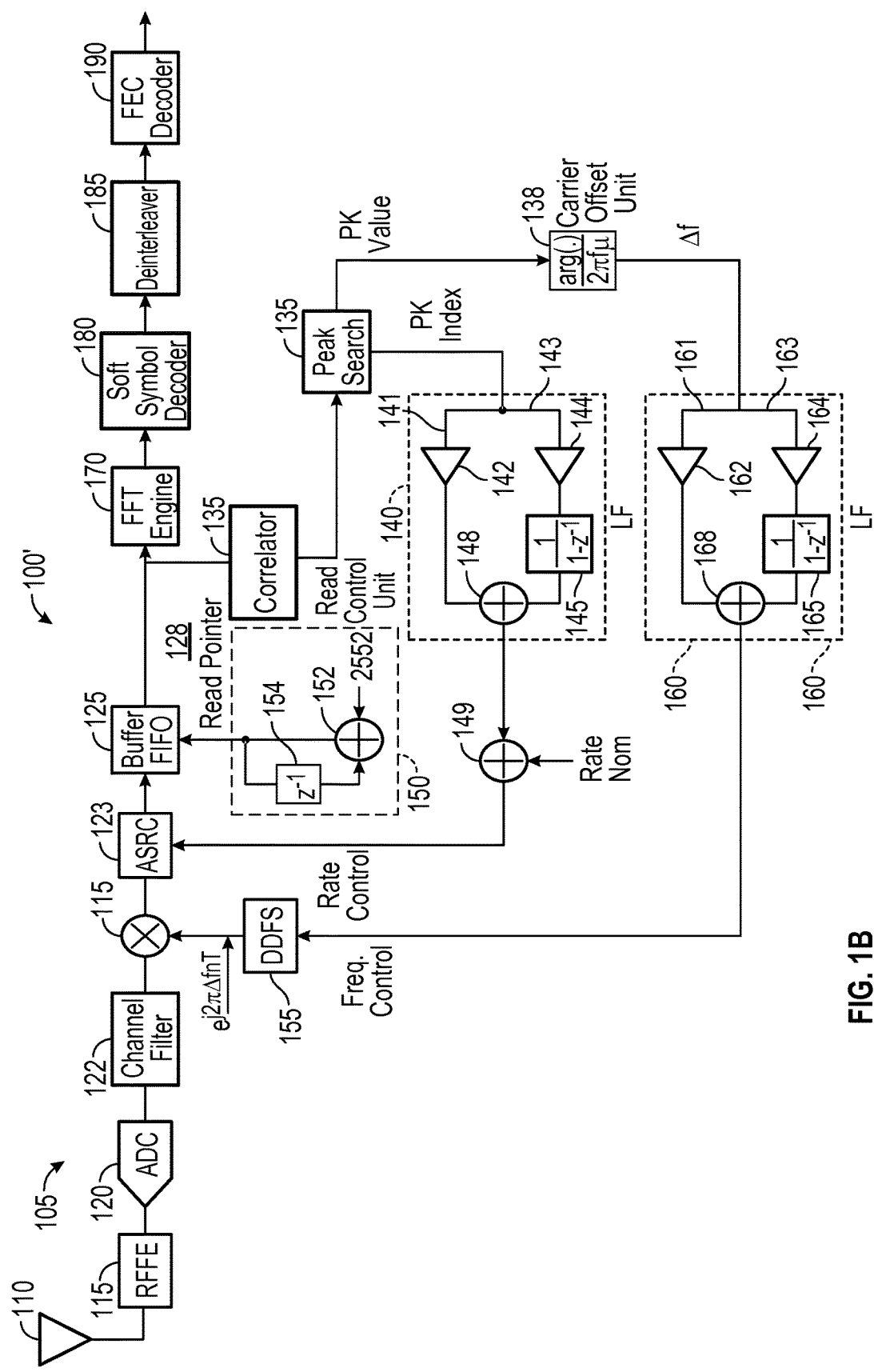

Referring now to FIG. 1B, shown is a block diagram of a receiver in accordance with another embodiment. As shown in FIG. 6, receiver 100' may generally be configured with the same signal processing path as described above with regard to FIG. 1A. However, note the presence of an asynchronous sample rate conversion (ASRC) unit 123 where sample rate conversion occurs prior to the samples being provided to buffer 125, which in an embodiment may be a FIFO buffer configured similarly as described above as to FIG. 1A. Note that the sample rate conversion may be implemented in embodiments in which an ADC of the receiver operates at a different sampling rate than the incoming DAB sample rate to enable appropriate sampling of the buffer output. Here, the feedback loop is configured to generate a feedback value that corresponds to a sample rate control value provided to ASRC 123.

Specifically, a nominal rate value is provided to control the sample rate conversion in ASRC unit 123. In an embodiment, this nominal rate value may be generated by a controller such as an MCU. For DAB systems, this nominal rate may correspond to 2.048 megasamples per second. In this embodiment, the feedback loop of synchronization unit 128 thus generates a sample rate offset that when added to the nominal sample rate in an adder 149 provides a sample rate control signal to ASRC unit 123 such that the samples are input into buffer 125 without any timing offset.

Thus in this embodiment, in addition to handling carrier frequency offsets (e.g., in the same manner discussed above with regard to FIG. 1A), timing offsets are also corrected such that the aligned symbols output from buffer 125 for further processing in a signal processing path of the receiver have no offsets whatsoever, enabling open loop operation with respect to a downstream demodulator. In this way, some embodiments may provide for a very basic demodulator that simply performs shifting, decoding and error correction without the need for complex processing of offset correction. In general, the other processing performed within this feedback circuit follows the operation described above as to the feedback circuit of FIG. 1A.

Figure 4:
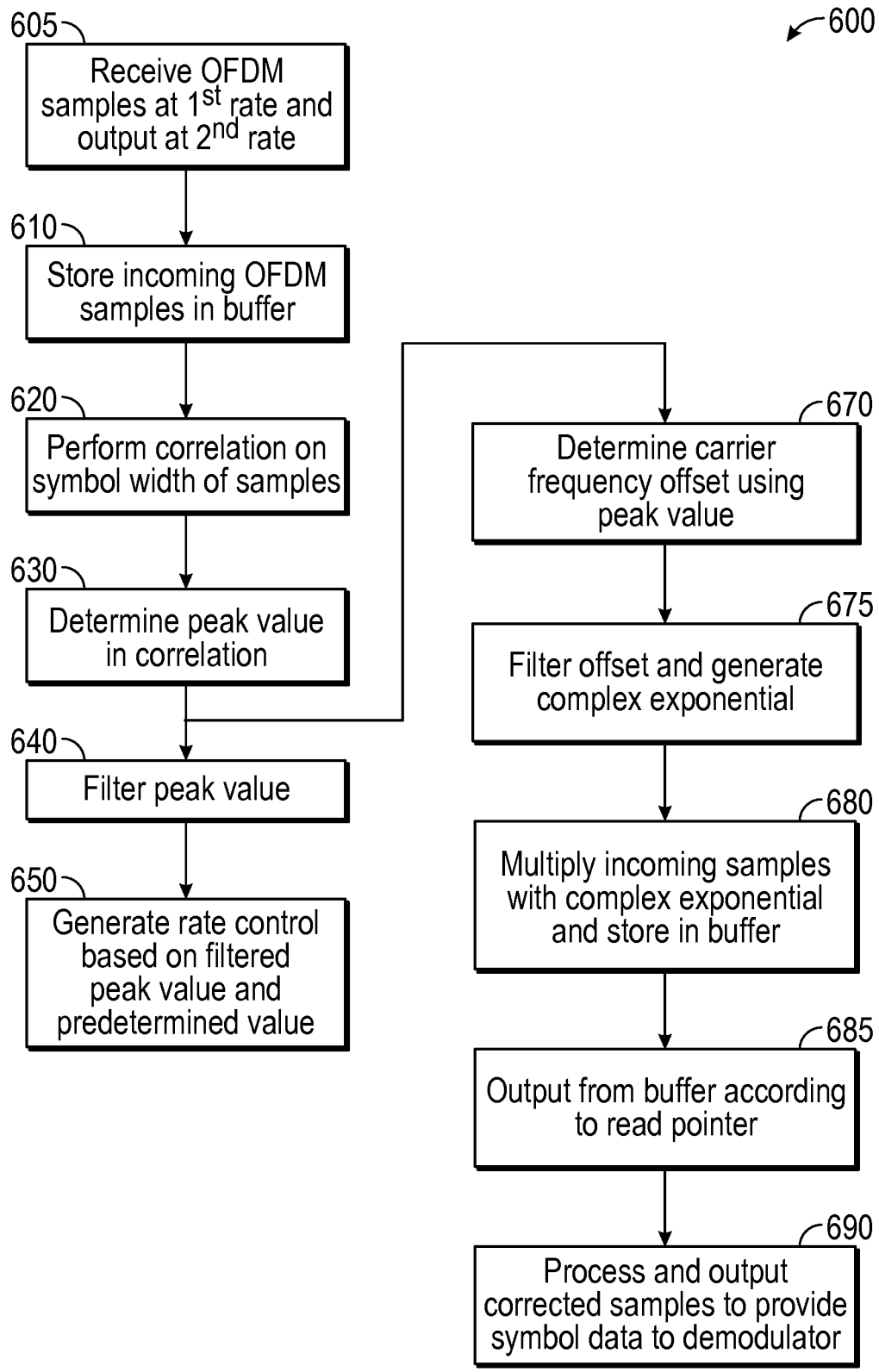
FIG. 4 is a flow diagram of a method for performing synchronization according to one embodiment.

Referring now to FIG. 4, shown is a flow diagram of a method for performing synchronization in accordance with an embodiment. As shown in FIG. 4, method 600 may be executed using at least in part a feedback circuit such as that of FIG. 1B. Method 600 begins by receiving incoming OFDM samples in an ASRC at a first rate and outputting them from the ASRC at a second programmable rate (block 605). Note that this second rate may be adapted by performing the synchronization operations described herein. Next the samples may be stored into a buffer (block 610). By the rate adaptation realized, these samples may be timing offset-corrected before storage into the buffer. More specifically, this rate adaptation slows down or speeds up the rate of samples written into the FIFO to achieve and maintain alignment. Next a correlation may be performed on a symbol width of samples (block 620). This correlation operation may be performed once per symbol by closing the feedback loop, in an embodiment.

Still referring to FIG. 4, a peak value in the correlation may be determined (block 630). This peak value corresponds to a sample index corresponding to a sample within the symbol (and presumably the first sample of the symbol). Next at block 640 this peak value is filtered, e.g., via a second-order filter.

Still referring to FIG. 4, at block 650 a rate control signal may be generated. More specifically, this control signal may be generated by summing the output of the filter with a predetermined value that corresponds to a nominal rate value. This control signal may be used to adjust the ASRC to thus output incoming samples at an adjusted sample rate to account for timing offset between transmitter and receiver, as performed at block 605.

In addition to this main feedback circuit operation to provide a feedback value used to control sample rate conversion and thus timing offset correction, in some embodiments carrier frequency offset correction may be performed using the peak value, as discussed above. In FIG. 4, the peak value may further be used for determining a carrier frequency offset (block 670), e.g., by determining the complex angle of the peak value, which corresponds to the carrier frequency offset. In turn, the carrier frequency offset is filtered and from the filtered offset, a complex exponential value may be generated (block 675). Then incoming samples may be multiplied with this complex exponential value, the result of which is stored into the buffer (block 680). Note that this storage of samples in block 680 thus corresponds to the block 610 step of storing samples into the buffer. However this complex multiplication occurs prior to storage of the samples into the buffer.

Next at block 685 samples may be output from the buffer. Finally, these output samples may be processed and output to provide symbol data to a demodulator to enable demodulation operations to be performed (block 690). Here, because both timing offset and carrier frequency offset correction have already been performed (optionally), demodulator implementation may be eased substantially. Although shown at this high level in the embodiment of FIG. 4, understand that variations are possible.

Figure 5:
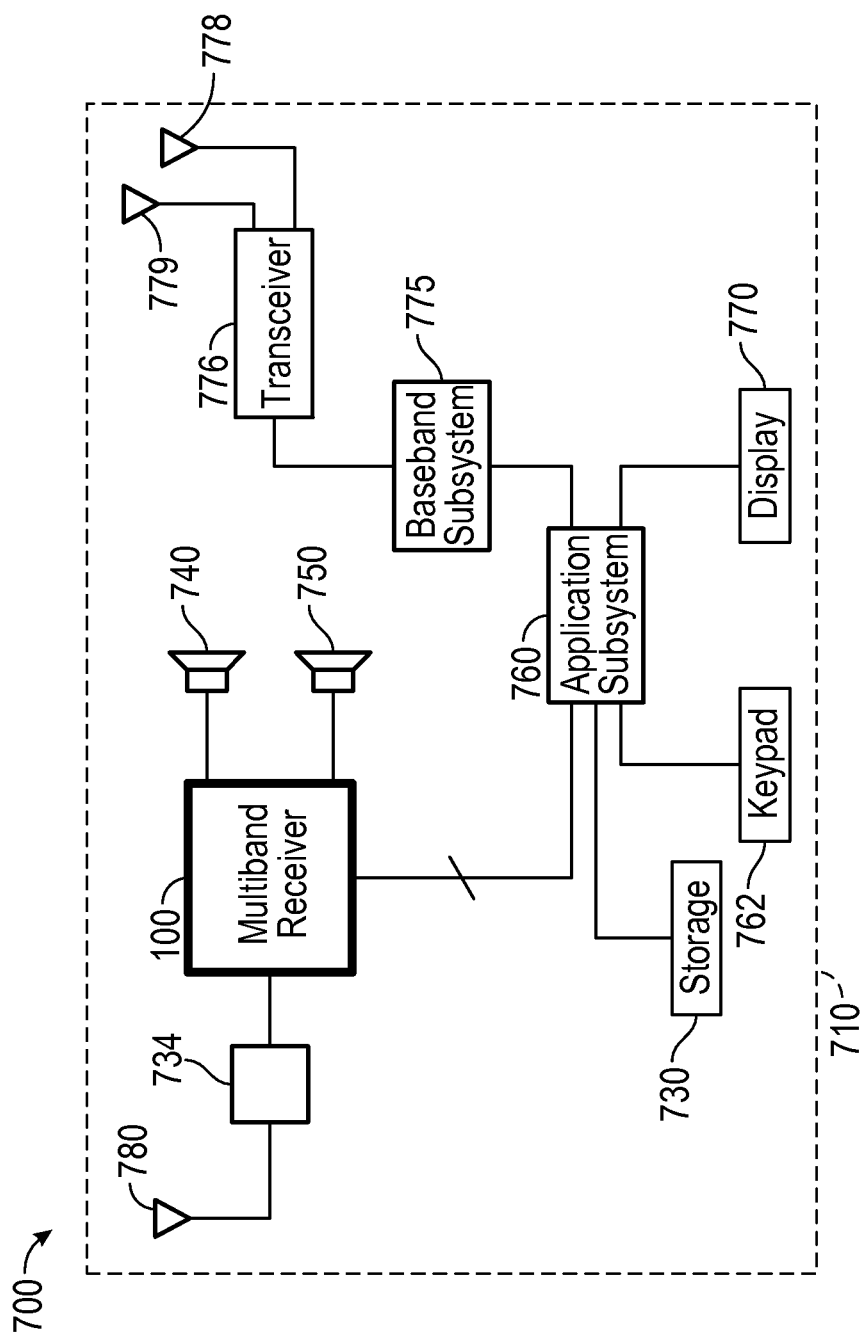
FIG. 5 is a block diagram of a multimedia portable wireless device, which in turn is part of a wireless system.

Referring to FIG. 5, shown is a block diagram of a multimedia portable wireless device 710, which in turn is part of a wireless system 700. In accordance with some embodiments a multiband receiver 100 may include one or more of the feedback loops described herein to realize faster synchronization and/or perform timing and carrier offset correction before communicating information to a demodulator. This demodulator may be a part of the receiver or a separate demodulator (not shown in FIG. 5). As examples, the wireless device 710 may be a multi-function, multi-band radio, cellular telephone, smartphone, PDA, tablet computer, mobile game device, or so forth and may play music or book downloads, and may be part of a wireless link between a satellite antenna and a radio receiver, a terrestrial receiver, etc.

Among its other various functions, the wireless device 710 may store digital content on a storage 730, which may be a flash memory or hard disk drive, as a few examples. The wireless device 710 generally includes an application subsystem 760 that may, for example, receive input from a keypad 762 of the wireless device 710 (which may be a touch pad, e.g., of a display 770) and display information on display 770. Furthermore, the application subsystem 760 may generally control the retrieval and storage of content from the storage 730 and the communication of, e.g., audio from receiver 100. As shown, receiver 100 may be directly connected to speakers 740 and 750 for output of audio data (understand that in some embodiments a separate audio processor may be integrated between the receiver and speakers). As depicted in FIG. 5, the multimode receiver 100 may be coupled by a matching network 734 to a receiver antenna 780.

In accordance with some embodiments of the invention, the wireless device 710 may have the ability to communicate over a communications network, such as a wide area, local area, or personal wireless network. For these embodiments, the wireless device 710 may include a baseband subsystem 775 that is coupled to the application subsystem 760 for purposes of encoding and decoding signals for this wireless network. Baseband subsystem 770 may be coupled to a transceiver 776 that is connected to corresponding transmit and receive antennas 778 and 779.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a buffer to store incoming time domain orthogonal frequency division multiplexed (OFDM) samples, the buffer to output the time domain OFDM samples according to a read pointer, wherein the read pointer is adjusted by a sum value corresponding to a sum of a length of a symbol and a feedback value, to align the read pointer with the symbol; and
   a feedback circuit coupled between an output of the buffer and a control input of the buffer to receive the output time domain OFDM samples from the buffer and generate the feedback value and provide the sum value to the control input of the buffer based at least in part on the output time domain OFDM samples output by the buffer, the feedback circuit comprising:
      a correlation unit to compute a prefix correlation on the output OFDM samples;
      a peak detector to detect at least one peak value of the prefix correlation and to output a sample index of the at least one peak value;
      a loop filter to filter the sample index; and
      a summer to generate the sum value, wherein the summer is to sum the sample index with a predetermined value corresponding to the symbol length to generate the sum value.

2. The apparatus of claim 1, further comprising a truncation unit to truncate the loop filter output to obtain an integer value.

3. The apparatus of claim 1, further comprising an integrator coupled to the summer to integrate the sum value.

4. The apparatus of claim 1, further comprising a carrier frequency offset unit to receive the peak value and to generate a carrier offset value therefrom.

5. The apparatus of claim 4, further comprising:
   a second loop filter to filter the carrier offset value to generate a frequency control signal;
   a frequency synthesizer to generate a complex exponential value; and
   a multiplier to multiply the incoming OFDM samples with the complex exponential value.

6. The apparatus of claim 1, wherein the loop filter comprises a second order filter including:
   a first path having an integral element;
   a second path having a proportional element and a filter element coupled to an output of the integral element; and a summer coupled to an output of the first and second paths.

7. An apparatus comprising:
a receiver front end to generate a channelized complex signal from an incoming radio frequency (RF) signal including a time domain orthogonal frequency division multiplexed (OFDM) stream;
a synchronization unit coupled to the receiver front end to receive the channelized complex signal and to determine symbol timing and a carrier frequency of the time domain OFDM stream without use of synchronization information within the time domain OFDM stream, wherein the synchronization unit comprises:
   a buffer to store samples of the time domain OFDM stream; and
   a feedback circuit coupled between an output of the buffer and a control input of the buffer to receive the time domain OFDM samples from the buffer and generate a read pointer for the buffer based at least in part on the time domain OFDM samples, the read pointer dynamically adjustable, wherein the feedback circuit comprises:
      a correlation unit to compute a cyclic prefix correlation on the time domain OFDM stream;
      a peak detector to detect at least one peak value of the cyclic prefix correlation and to output a sample index of the at least one peak value;
      a loop filter to filter the sample index; and
      a summer to generate a sum value, wherein the summer is to sum the sample index with a predetermined value corresponding to a symbol length to generate the sum value, the read pointer comprising the sum value; and
the apparatus comprising a tuner to provide an output data stream to a demodulator having substantially zero timing offset and substantially zero frequency offset.

8. The apparatus of claim 7, wherein the read pointer is to align the transmitted OFDM symbol to a window of a fast Fourier transform (FFT) engine.

9. The apparatus of claim 7, wherein the loop filter comprises a first path having an integral element, a second path having a proportional element and a filter element coupled to an output of the integral element, and a second summer coupled to an output of the first and second paths.

10. A method comprising:
storing time domain orthogonal frequency division multiplexed (OFDM) samples in a buffer of a receiver;
performing a correlation on a symbol width of the time domain OFDM samples obtained from the buffer;
determining a peak value in the correlation, the peak value corresponding to an index of a peak time domain OFDM sample;
filtering the peak value;
generating a sum value according to a sum of the filtered peak value and a predetermined symbol width corresponding to the symbol width; and
outputting the time domain OFDM samples from the buffer to a signal processing path of the receiver based at least in part on the filtered peak value, including controlling the output of the time domain OFDM samples from the buffer according to a read pointer comprising the sum value generated based on the filtered peak value and the predetermined symbol width.

11. The method of claim 10, further comprising:
determining a carrier frequency offset using the peak value; and
correcting the time domain OFDM samples output from the buffer based on the carrier frequency offset.

12. The method of claim 10, further comprising receiving the time domain OFDM samples from a front end circuit of the receiver at a first rate and storing the time domain OFDM samples into the buffer at a second rate.

* * * * *